(12) United States Patent
Goebel et al.

(10) Patent No.: US 8,277,988 B2
(45) Date of Patent: Oct. 2, 2012

(54) ANODE WATER SEPARATOR FOR A FUEL CELL SYSTEM

(75) Inventors: Steven G. Goebel, Victor, NY (US); Steven R. Falta, Honeoye Falls, NY (US); Jon P. Owejan, Honeoye, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 710 days.

(21) Appl. No.: 12/397,851

(22) Filed: Mar. 4, 2009

(65) Prior Publication Data
US 2010/0227230 A1  Sep. 9, 2010

(51) Int. Cl.
*H01M 8/06* (2006.01)
(52) U.S. Cl. ........ 429/414; 429/412; 429/413; 429/415; 429/450
(58) Field of Classification Search .................. 429/412, 429/413, 414, 415, 450
See application file for complete search history.

(56) References Cited

U.S. PATENT DOCUMENTS

| | | | |
|---|---|---|---|
| 2003/0211374 A1* | 11/2003 | Dehne | 429/26 |
| 2008/0171253 A1 | 7/2008 | Owejan et al. | |
| 2008/0318100 A1 | 12/2008 | Owejan | |
| 2010/0143754 A1* | 6/2010 | Greszler et al. | 429/13 |

* cited by examiner

*Primary Examiner* — Keith Walker
*Assistant Examiner* — Caleb Henry
(74) *Attorney, Agent, or Firm* — Fraser Clemens Martin & Miller LLC; J. Douglas Miller

(57) ABSTRACT

An anode reactant recycling system for a fuel cell is disclosed, the system including a hollow main body, a bleed conduit, an injector, a water separator, and a hydrophilic porous media. The anode reactant recycling system for a fuel cell is adapted to minimize a required number of components, eliminate the need for the anode heat exchanger, use a single valve for removal of condensate and reactant byproducts from the anode reactant recycling system, and provide an upstream volume for startup pressurization.

17 Claims, 3 Drawing Sheets

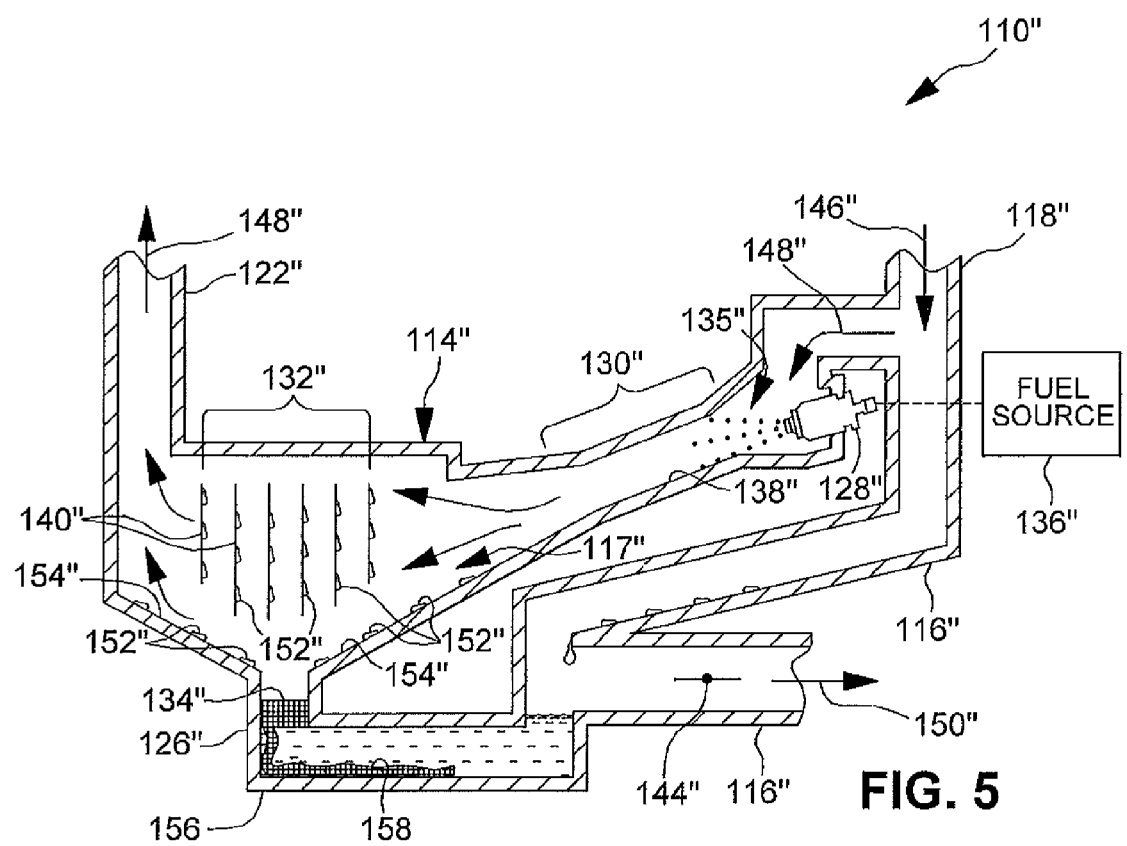

US 8,277,988 B2

ANODE WATER SEPARATOR FOR A FUEL CELL SYSTEM

FIELD OF THE INVENTION

The present invention relates to a fuel cell system and, more particularly, to an apparatus for optimized anode reactant recycling.

BACKGROUND OF THE INVENTION

A fuel cell has been proposed as a clean, efficient, and environmentally responsible energy source for electric vehicles and various other applications. In particular, the fuel cell has been identified as a potential alternative for the traditional internal-combustion engine used in modern vehicles. One type of fuel cell is known as a proton exchange membrane (PEM) fuel cell. Individual fuel cells can be stacked together in series to form a fuel cell stack. The fuel cell stack is capable of supplying a quantity of electricity sufficient to provide power to a vehicle.

Hydrogen is a very attractive fuel because it is clean and can be used to efficiently produce electricity in the fuel cell. A hydrogen fuel cell is an electro-chemical device that includes an anode and a cathode with an electrolyte therebetween. The anode receives hydrogen gas and the cathode receives oxygen or air. The hydrogen gas is dissociated in the anode to generate free protons and electrons. The protons pass through the electrolyte to the cathode. The electrons from the anode cannot pass through the electrolyte, and thus, are directed through a load to perform work before being sent to the cathode. The protons react with the oxygen and the electrons in the cathode to generate water. Not all of the hydrogen is consumed by the stack and some of the hydrogen is output as an anode exhaust gas that may include water and nitrogen. A portion of the anode exhaust gas may be recycled to maintain an anode stoichiometry without the use of excess hydrogen.

Proton exchange membrane fuel cells (PEMFC) are a popular fuel cell for vehicles. The PEMFC generally includes a solid polymer-electrolyte proton-conducting membrane, such as a perfluorosulfonic acid membrane, for example. The anode and cathode typically include finely divided catalytic particles, usually platinum (Pt), supported on carbon particles and mixed with an ionomer. The catalytic mixture is deposited on opposing sides of the membrane. The combination of the anode catalytic mixture, the cathode catalytic mixture, and the membrane define a membrane electrode assembly (MEA).

Several individual fuel cells are typically combined in a fuel cell stack to generate the desired power. For the automotive fuel cell stack mentioned above, the stack may include two hundred or more fuel cells.

Anode reactant recycling systems typically include an anode heat exchanger for heating non-recycled hydrogen to be mixed with the portion of the anode exhaust gas, a hydrogen injector, a water separator and drain valve, and an exhaust valve for removal of reactant byproducts such as water and nitrogen. Anode reactant recycling systems typically require the use of the drain valve and the exhaust valve to perform the respective tasks of removing water and nitrogen from the fuel cell stack.

Heating of the non-recycled hydrogen through the use of an anode heat exchanger is necessary prior to mixing with the recycled portion of the anode exhaust gas to militate against water condensation. Water condensation occurs when the non-recycled hydrogen (at a temperature of an operating environment the vehicle is in) is mixed with the portion of the anode exhaust gas (approximately 60°-80° C.).

Additionally, the anode exhaust gas may contain condensed water as a result of the electrochemical reaction in the fuel cell stack or lower temperatures in the anode reactant recycling system. The water condensation must then be removed by the water separator and drain valve before the mixture re-enters the fuel cell stack. Typically, the drain valve diverts the anode exhaust gas from the hydrogen injector after the anode exhaust gas passes through the water separator. Accordingly, water in the water separator is exhausted from the system with the anode exhaust gas. Water condensation not removed from the mixture that enters the fuel cell stack may cause cell starvation by inhibiting reactant flow.

Nitrogen may be removed from the anode exhaust gas by bypassing the water separator and the injector. Typically, the exhaust valve diverts the anode exhaust gas from the water separator and the hydrogen injector to an exhaust of the vehicle. Diverting the anode exhaust gas prior to the water separator and the hydrogen injector minimizes the loss of hydrogen while removing nitrogen from the anode exhaust gas.

Anode reactant recycling systems are expensive and increase a cost of a vehicle into which the anode reactant recycling system is incorporated and can be volumetrically inefficient, often requiring considerable space within an end unit of the fuel cell stack. The employment of such systems undesirably adds to a complexity in designing and manufacturing the fuel cell stack. The addition of the anode heat exchanger also undesirably requires additional componentry in order to facilitate heating the non-recycled hydrogen. Further, the use of two separate valves (the drain valve and the exhaust valve) adds undesirable cost and complexity to the anode reactant recycling system.

It would be desirable to produce an anode reactant recycling system for a fuel cell stack that eliminates the need for the anode heat exchanger, increases volumetric efficiency of the anode reactant recycling system, uses a single valve for removal of condensate and reactant byproducts from the anode reactant recycling system, and provides an upstream volume for startup pressurization.

SUMMARY OF THE INVENTION

Presently provided by the invention, an anode reactant recycling system for a fuel cell stack that eliminates the need for the anode heat exchanger, increases volumetric efficiency of the anode reactant recycling system, uses a single valve for removal of condensate and reactant byproducts from the anode reactant recycling system, and provides an upstream volume for startup pressurization, has surprisingly been discovered.

In one embodiment, an anode reactant recycling system for a fuel cell stack comprises a hollow main body including an inlet, a recycle outlet, and a draining outlet, the inlet adapted to receive a fluid, a bleed conduit providing fluid communication between the inlet and the draining outlet, an injector in fluid communication with a fuel source and the hollow main body adapted to inject a fuel into the hollow main body, a water separator disposed in the hollow main body adapted to remove a condensate from the fluid, and a hydrophilic porous media in fluid communication with the water separator and adapted to collect the condensate in the hollow main body, thereby hydrating the hydrophilic porous media and militating against gas transfer through the hydrophilic porous media, wherein a first portion of the fluid is exhausted from the anode reactant recycling system through the bleed conduit and a second portion of the fluid enters the hollow main body, mixes with the fuel, and passes through the water separator before exiting the anode reactant recycling system through the recycle outlet.

In another embodiment, an anode reactant recycling system for a fuel cell stack comprises a hollow main body including an inlet, a recycle outlet, and a draining outlet, the inlet adapted to receive a fluid, a bleed conduit facilitating fluid communication between the inlet and the draining outlet, an injector disposed in the hollow main body and adapted to inject a fuel from a fuel source, a water separator disposed in the hollow main body adapted to remove a condensate from the fluid, a hydrophilic porous media in fluid communication with the water separator and adapted to collect the condensate in the hollow main body, thereby hydrating the hydrophilic porous media and militating against gas transfer through the hydrophilic porous media, and a water reservoir disposed adjacent the hydrophilic porous media adapted to receive the condensate passing through the hydrophilic porous media, wherein a first portion of the fluid is exhausted from the anode reactant recycling system through the bleed conduit and a second portion of the fluid enters the hollow main body, mixes with the fuel, and passes through the water separator before exiting the anode reactant recycling system through the recycle outlet.

The invention also provides methods for recycling of anode reactants in a fuel cell.

In one embodiment, a method for the recycling of anode reactants in a fuel cell comprises providing a hollow main body including an inlet, a recycle outlet, and a draining outlet, the inlet adapted to receive a fluid, providing a bleed conduit facilitating fluid communication between the inlet and the draining outlet, providing an injector disposed in the hollow main body and adapted to inject a fuel from a fuel source, providing a water separator disposed in the hollow main body, providing a hydrophilic porous media in fluid communication with the water separator, providing an anode exhaust stream to the inlet, dividing the anode exhaust stream into one of a first portion entering the bleed conduit and a second portion entering the hollow main body, exhausting the first portion of the anode exhaust stream through the draining outlet, injecting the fuel into the hollow main body and mixing the second portion of the anode exhaust stream with the fuel, collecting a condensate formed in the hollow main body with the water separator, hydrating the hydrophilic porous media with the condensate, the hydrated media militating against transfer of one of the first portion of the anode exhaust stream and the second portion of the anode exhaust stream through the hydrophilic porous media, exhausting the condensate in excess of a saturation point of the hydrophilic porous media through the hydrophilic porous media and the draining outlet, and exhausting the second portion of the anode exhaust stream and the injected fuel through the recycle outlet.

BRIEF DESCRIPTION OF THE DRAWINGS

The above, as well as other advantages of the present invention, will become readily apparent to those skilled in the art from the following detailed description, when considered in the light of the accompanying drawings in which:

FIG. 5 illustrates a schematic side cross sectional view of the anode reactant recycling system according to another embodiment of the invention.

DETAILED DESCRIPTION OF EXEMPLARY EMBODIMENTS OF THE INVENTION

The following detailed description and appended drawings describe and illustrate various exemplary embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

Figure 1:
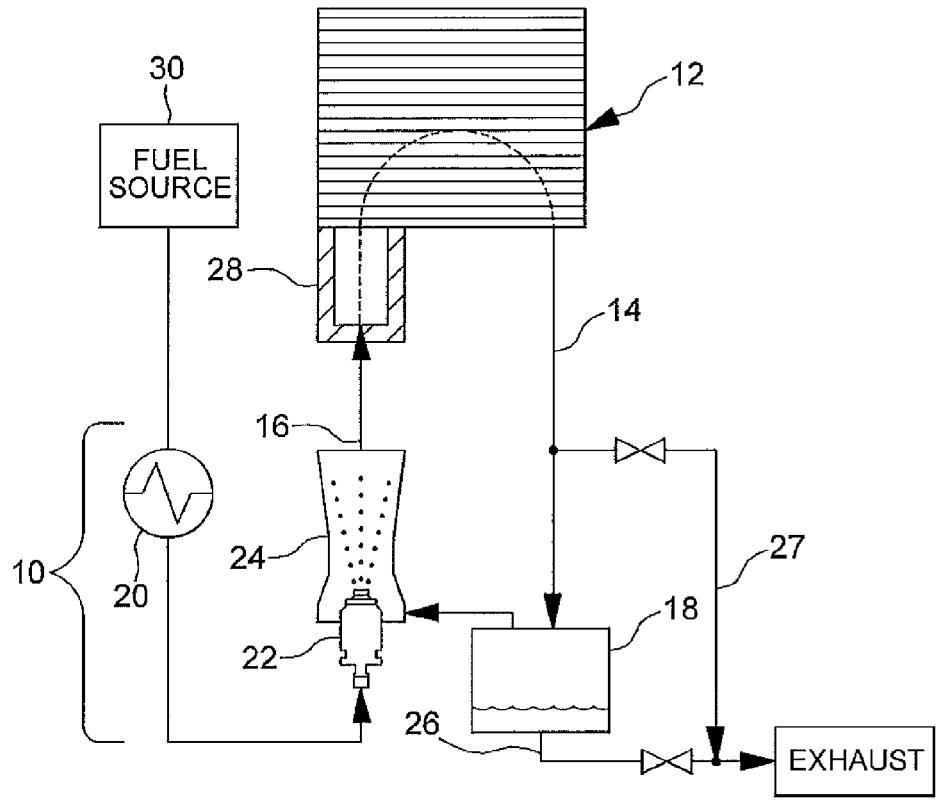
FIG. 1 illustrates a schematic flow diagram of an anode reactant recycling system and a fuel cell stack according to the prior art.

FIG. 1 illustrates an anode reactant recycling system 10 according to the prior art. The anode reactant recycling system 10 is in fluid communication with a fuel cell stack (FCS) 12 through an anode outlet conduit 14 and an anode inlet conduit 16. A fuel such as hydrogen or byproducts (water and nitrogen) flow through the conduits 16, 14 when respectively entering or leaving the FCS 12. The anode reactant recycling system 10 includes a water separator 18, an anode heat exchanger 20, and an injector 22. The water separator 18 collects liquid water within the system 10. An inlet of the water separator 18 is in fluid communication with the anode outlet conduit 14, and outlets of the water separator 18 are in fluid communication with an ejector 24 and a drain conduit 26. The anode outlet conduit 14 is also in fluid communication with a bleed conduit 27. Valves disposed in the drain conduit 26 and the bleed conduit 27 respectively permit water and nitrogen gas to be exhausted from the system 10. The ejector 24 is disposed downstream of and is in fluid communication with the injector 22. An inlet for the ejector 24 is in fluid communication with the water separator 18, and an outlet of the ejector 24 is in fluid communication with the anode inlet conduit 16. The injector 22 and ejector 24 together form a jet pump, wherein unused reactants and nitrogen leaving the water separator 18 are mixed with fuel leaving the anode heat exchanger 20. An inlet of a startup chamber 28 is in fluid communication with the anode inlet conduit 16 and an outlet of the startup chamber 28 is in fluid communication with the FCS 12. Pressurization of the startup chamber 28 with fuel in anticipation of a startup of the FCS 12 militates against corrosion of electrodes within individual fuel cells during the startup. A method of providing chambers for startup pressurization, is disclosed in assignee's copending application Ser. No. 12/014,326, incorporated herein by reference in its entirety. An inlet of the injector 22 is in fluid communication with the anode heat exchanger 20. An inlet of the anode heat exchanger 20 is in fluid communication with a fuel source 30 and is adapted to heat the fuel prior to injection into the anode inlet conduit 16, thereby militating against the forming of condensation upon injection.

The anode reactant recycling system 10 may be disposed in an end unit (not shown) of the FCS 12. The end unit houses fuel cell subsystems and related devices that aid in a preconditioning and an operation of the FCS 12. It is understood that the configurations of the various components of the anode reactant recycling system 10 in FIG. 1 are for the purpose of illustration, and other configurations may be chosen as desired.

Figure 2:
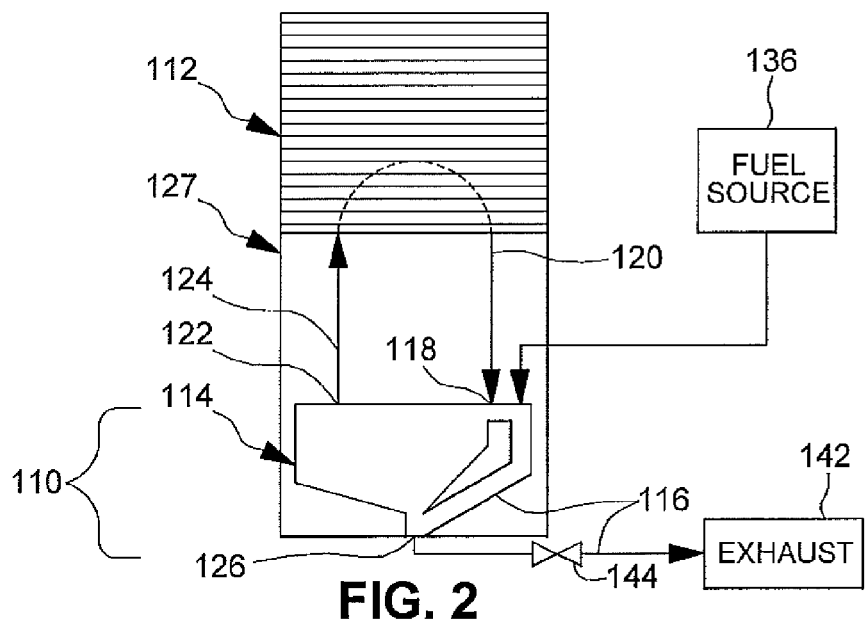
FIG. 2 illustrates a schematic flow diagram of an anode reactant recycling system and a fuel cell stack according to the present invention.
Figure 3:
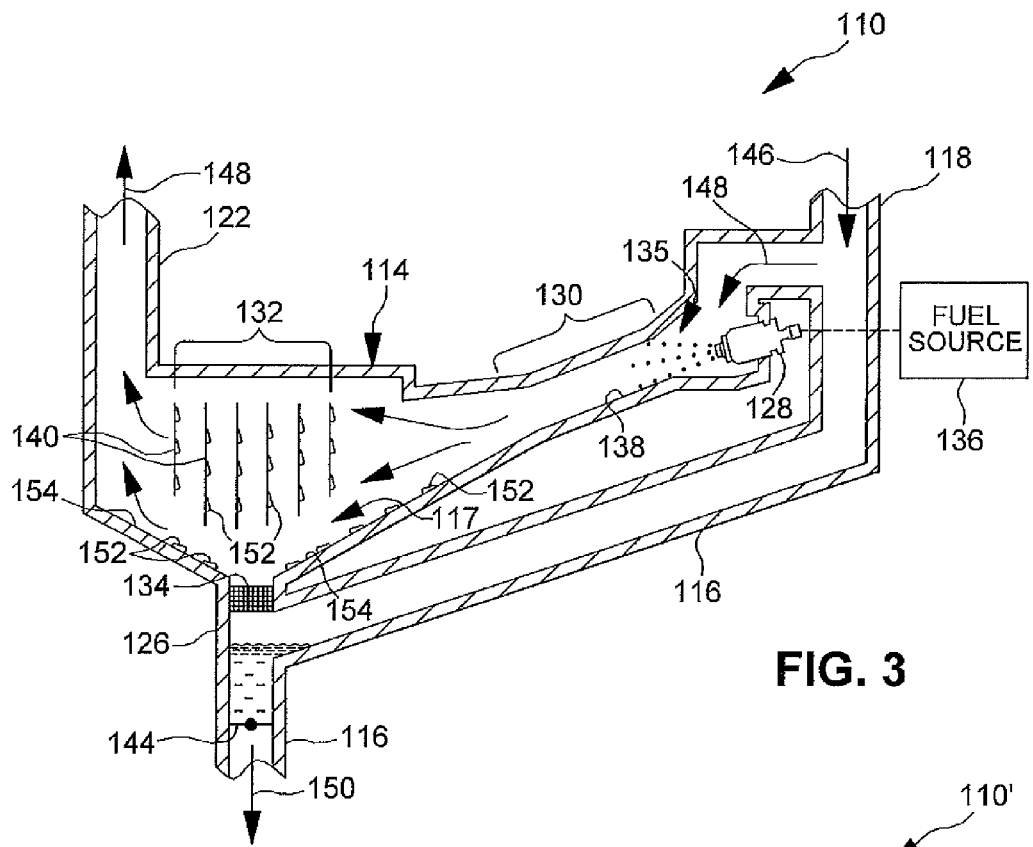
FIG. 3 illustrates a schematic side cross sectional view of the anode reactant recycling system of FIG. 2.

FIGS. 2 and 3 illustrate an anode reactant recycling system 110 according to an embodiment of the invention. The anode reactant recycling system 110 is in communication with a fuel cell stack (FCS) 112. The anode reactant recycling system 110 includes a recycler 114 and a bleed conduit 116.

The recycler 114 has a hollow body with a cavity 117 formed therein. The cavity 117 is in fluid communication with the FCS 112. An inlet 118 of the recycler 114 is in fluid communication with an anode outlet conduit 120. A supply outlet 122 of the recycler 114 provides fluid communication with an anode inlet conduit 124. A draining outlet 126 and the inlet 118 of the recycler 114 provide fluid communication with the bleed conduit 116. The recycler 114 may be formed from any conventional material such as a metal, a metal alloy, a plastic, and a plastic composite, for example. The recycler 114 may be formed separately from other components or may be integrally formed within a fuel cell end unit 127 of the FCS 112. As shown, the recycler 114 includes an injector 128, an ejector 130, a water separator 132, and a hydrophilic porous media 134 disposed therein.

The injector 128 is a fuel injector as is known in the art, wherein the injector 128 provides fluid communication between a fuel source 136 and the cavity 117. A gaseous fuel 135 from the fuel source 136 is delivered by the injector 128 to the cavity 117, particularly to an inlet of the ejector 130.

The ejector 130 is disposed between the injector 128 and the water separator 132, and includes a Venturi passage 138. The Venturi passage 138 has a neck portion having a smaller diameter than a remaining passage portion. Any conventional material such as a metal, a metal alloy, a plastic, and a plastic composite, for example, may be used to form the ejector 130. The ejector 130 may be integrally formed as a portion of the fuel cell end unit 127 or the recycler 114. Any conventional means such as fastening or adhesion, for example, may be used to couple the ejector 130 to the recycler 114 when the ejector 130 is formed separately. As is known in the art, combining the injector 128 and the ejector 130 in series forms a jet pump or an aspirator.

Figure 4:
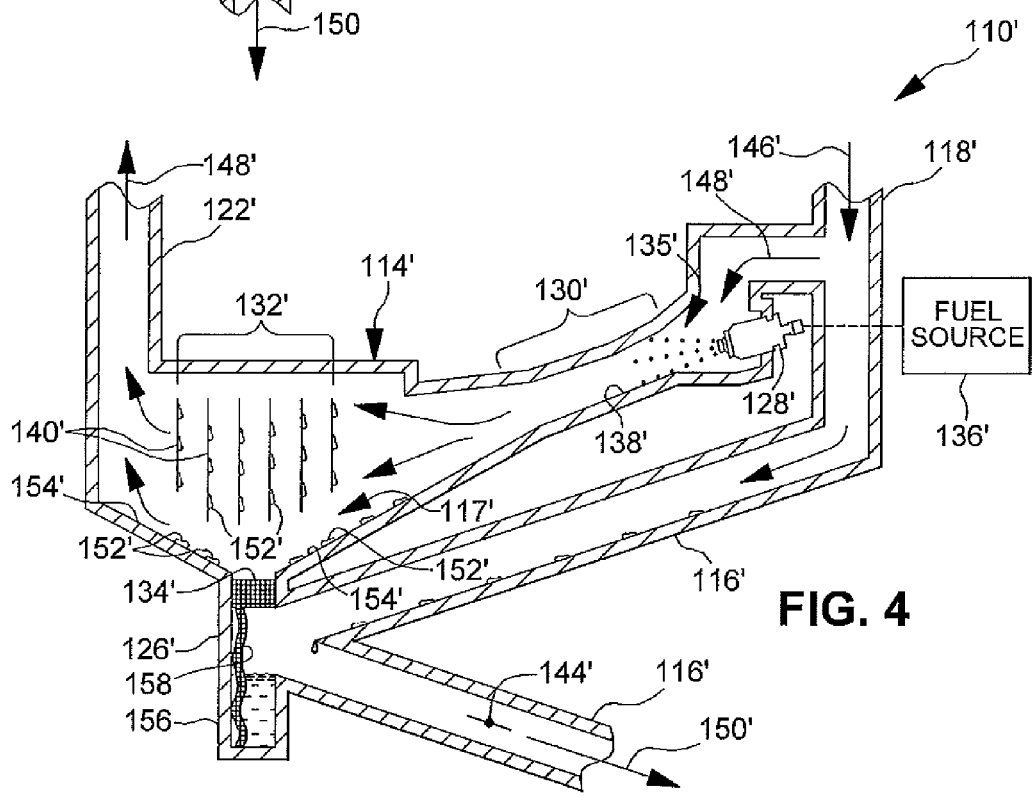
FIG. 4 illustrates a schematic side cross sectional view of the anode reactant recycling system according to another embodiment of the invention.

The water separator 132 is disposed in the cavity 117 of the main body 114 between the ejector 130 and the supply outlet 122. The recycler 114 may include the water separator 132 as integrally formed. Alternately, the water separator 132 may be formed separately and coupled to the recycler 114 by any conventional means such as fastening or adhesion, for example. Any conventional material such as a metal, a metal alloy, a plastic, and a plastic composite, for example, may be used to form the water separator 132. The water separator 132 includes a plurality of water capture features. As illustrated in FIGS. 3, 4, and 5, the water separator 132 is a plurality of parallel baffles 140. Other baffle arrangements, a series of chambers, a plurality of boustrophedonic passages, a cyclonic separator, or any other type of water capture feature may also be used as the water separator 132.

The hydrophilic porous media 134 is sealingly disposed in the draining outlet 126 of the recycler 114. The cavity 117, the bleed conduit 116, and the water separator 132 are in fluid communication with the media 134. The media 134 may be coupled to the recycler 114 by any conventional means such as adhesion or a friction fit, for example. Any conventional material such as a metal mesh, a sintered metal mesh, a bonded metal mesh, a woven cloth, and a porous foam, including pores formed therein, for example, may be used to form the hydrophilic porous media 134. The pores formed in the hydrophilic porous media 134 are typically from about 1 micron to about 10 microns in diameter. A material forming the hydrophilic porous media 134 may be selected based on a nominal pore size and a uniformity of the pores formed therein.

The bleed conduit 116 is disposed adjacent the recycler 114 and provides fluid communication between the inlet 118 and an exhaust 142. The draining outlet 126 and the media 134 are also in fluid communication with the bleed conduit 116. The bleed conduit 116 may be integrally formed as a portion of the fuel cell end unit 127 or the recycler 114, and may be formed from any conventional material such as a metal, a metal alloy, a plastic, and a plastic composite, for example. Any conventional means such as fastening or adhesion, for example, may be used to couple the bleed conduit 116 to the recycler 114 when the conduit 116 is formed separately. As illustrated in FIG. 3, the bleed conduit 116 may be positioned to militate against a condensate from collecting in the bleed conduit 116 that may form therein. As shown, the bleed conduit 116 includes an exhaust valve 144 disposed therein.

The exhaust valve 144 is disposed at a downstream position in relation to the draining outlet 126. A controller and an actuator (not shown) in communication with the exhaust valve 144 change a position of the exhaust valve 144 as desired. The valve 144 may be positioned in an open position, a closed position, or any intermediate position. The exhaust valve 144 may be a solenoid operated gate valve, but other valves types may be used.

During operation of the anode reactant recycling system 110, an anode exhaust stream 146 is exhausted from the FCS 112 through the anode outlet conduit 120. The anode exhaust stream 146 contains unused fuel and byproducts such as water and nitrogen. Upon the exhaust stream 146 entering the inlet 118 of the recycler 114, it will become one of a recycle stream 148 (entering the recycler 114) and a bleed stream 150 (entering the bleed conduit 116), dependent on a position of the valve 144. As a nonlimiting example, when the valve 144 is in an open position the bleed stream 150 may be substantially equal to the exhaust stream 146. As a second nonlimiting example, a position of the valve 144 may be determined by a content of the exhaust stream 146, where a relatively high content of unused fuel in the stream 146 may dictate a closed position of the valve 144 and a relatively high content of byproducts in the stream 146 may dictate an open position of the valve 144. As a further nonlimiting example, the position of the valve 144 may be determined by a water level sensor (not shown) or other control device, in response to condensate accumulated within one of the bleeding conduit 116 and the recycler 114

The delivery rate of the injector 128 may control the portion of the exhaust stream 146 segmented into the recycle stream 148. The jet pump (injector 128 and ejector 130) facilitates an intake of the exhaust stream 146 through the use of the Venturi effect. Sufficient mixing of the fuel 135 and the recycle stream 148 is thus effected through the use of the injector 128 and the ejector 130. The recycle stream 148 (warm and humid) mixing with the injected fuel 135 (cold and dry) results in the formation of a condensate 152. The recycle stream 148 including the condensate 152 then flows across the water separator 132 as the recycle stream 148 moves towards the supply outlet 122.

As the recycle stream 148 flows across the water separator 132, the baffles 140 or other water capture features impede the recycle stream 148. A resulting centripetal acceleration of the recycle stream 148 causes the heavy condensate 152 to collect on the baffles 140, removing the condensate 152 from the recycle stream 148. The recycle stream 148 having a reduced amount of condensate 152 continues through the cavity 117 and exits the recycler 114 at the supply outlet 122. The recycle stream 148 having a higher fuel content (due to fuel injection) and a lower water content (after flowing across the water separator 132) may re-enter the FCS 112 as shown in FIG. 2 through the anode inlet conduit 124. As the condensate 152 collects on the water separator 132, gravity causes the condensate 152 to drain from the baffles 140 and onto a collection surface 154. The collection surface 154 guides the condensate 152 towards the hydrophilic porous media 134 through the use of gravity.

The hydrophilic porous media 134 militates against transfer of the recycle stream 148 and the bleed stream 150 through the media 134 when hydrated by the condensate 152. A pressure the hydrophilic porous media 134 can withstand may be calculated by the bubble pressure method of surface tension. The relationship of the bubble pressure of a medium having pores of a specified diameter can be expressed as the following equation:

$$P_{bubble} = 4\sigma * \cos(\theta)/D_{pore}$$

where, $P_{bubble}$ is a maximum pressure the hydrophilic porous media 134 can withstand when hydrated; $\sigma$ is the surface tension of water; $\theta$ is the contact angle of the hydrophilic porous media 134; and $D_{pore}$ is the diameter of the pores in the hydrophilic porous media 134. As nonlimiting examples, the pores in the hydrophilic porous media 134 having the diameter of about 5 microns yield a bubble pressure of about 46 kPa, and the pores having the diameter of about 8 microns yield a bubble pressure of about 29 kPa, where the contact angle of the hydrophilic porous media 134 is about 30° and the surface tension of water is 0.067 N/m. A saturation point for the hydrophilic porous media 134 is the condition where the hydrophilic porous media 134 has absorbed the greatest amount of water it can hold. The condensate 152 in excess of the media 134 saturation point passes through the media 134 and exits the system 110 through the bleed conduit 116. As illustrated in FIG. 3, when the exhaust valve 144 is in a closed position, the condensate 152 may collect in the bleed conduit 116 until the system 110 requires byproduct purging. During byproduct purging, the exhaust valve 144 is opened, allowing the anode exhaust stream 146 to be exhausted through the bleed conduit 116, removing the condensate 152 and any nitrogen buildup. When the exhaust stream 146 has a low relative humidity, such as when the FCS 112 is operated at full power at high temperatures, the condensate 152 produced in the cavity 117 may not be enough to hydrate the media 134. Having the dry media 134 allows the recycle stream 148 and the bleed stream 150 to mix through the media 134, militating against the recycle of any unused reactant in the recycle stream 148 while wasting the fuel passing through the injector 128. During the aforementioned conditions, the exhaust valve 144 will remain closed until byproduct purging is required In addition to eliminating the need for the anode heat exchanger and the drain valve, the cavity 117 of the system 110 may also be used as an upstream chamber for startup pressurization, increasing a volumetric efficiency of the anode reactant recycling system 110. In anticipation of startup, the exhaust valve 144 is closed. Activation of the injector 128 increases a pressure within the cavity 117 and an anode side of the FCS 112, thereby reducing or eliminating the need for the startup chamber 28 of the prior art system 10. The cavity 117 provides a volume between the injector 128 and the FCS 112, militating against the fuel from entering the FCS 112 prior to startup. The resulting anode reactant recycling system 110 has a higher volumetric efficiency and is more compact than the prior art system 10.

FIG. 4 shows another embodiment of the invention similar to that shown in FIG. 3. Reference numerals for similar structure in respect of the description of FIG. 3 are repeated in FIG. 4 with a prime (') symbol.

FIG. 4 illustrates the addition of a water reservoir 156 and a wicking material 158 to the anode reactant recycling system 110'. It should be appreciated that, unless otherwise noted, the anode reactant recovery system 110' may correspond substantially in structure and operation to the illustrative anode reactant recovery system 110 of the art described hereinabove.

The water reservoir 156 is a hollow body and may be formed from one of a metal, metal alloy, plastic, and plastic composite and is disposed adjacent the hydrophilic porous media 134'. The water reservoir 156 may be integrally formed as a portion of the fuel cell end unit 127, the recycler 114', and the bleed conduit 116'. The water reservoir 156 may also be formed separately and coupled to one of the recycler 114' and the bleed conduit 116' by any conventional means such as fastening or adhesion, for example.

The wicking material 158 is in fluid communication with the hydrophilic porous media 134' and the water reservoir 156. Any conventional material such as a metal mesh, a sintered metal mesh, a bonded metal mesh, a woven cloth, and a porous foam, for example, may be used to form the wicking material 158. Other materials having similar wicking properties may also be used. The wicking material 158 may be integrally formed with the hydrophilic porous media 134' when formed of a similar material. The wicking material 158 may also be fastened to the hydrophilic porous media 134' by any conventional means when formed from other materials. At least a portion of the wicking material 158 is disposed in the water reservoir 156.

In use, the condensate 152' in excess of the media 134' saturation point passes through the media 134' and collects in the water reservoir 156 due to a force of gravity. As illustrated in FIG. 4, the water reservoir 156 is a well style reservoir, and is in fluid communication with the media 134' and the conduit 116' at the same end of the water reservoir 156. The water reservoir 156 becomes full after a period of operation of the anode reactant recycling system 110'. An overflow from the reservoir 156 exhausts from the system 110' through the bleed conduit 116', aided by the flow of unused reactant and byproducts. When an exhaust stream 146 of the FCS 112 has a high relative humidity, such as when the FCS 112 is operating below a normal operating temperature (cold start), the condensate 152' is more than is needed to hydrate the media 134', filling the reservoir 156. When the exhaust stream 146 of the FCS 112 has a low relative humidity, such as when the FCS 112 is operated at full power at high temperatures, the condensate 152' produced in the cavity 117' may not be enough to hydrate the media 134'.

The wicking material 158 facilitates fluid communication by capillary action from the water reservoir 156 to the hydrophilic porous media 134'. Upon a saturation level of the media 134' decreasing below the saturation point of the media 134' the wicking material 158 allows capillary forces to hydrate the media 134, until the reservoir 156 is empty. Fluid communication between the wicking material 158 and the media 134' continues until the saturation point has been reached. Byproduct purging of the anode reactant recycling system 110' may be intermittent or continuous, dependent on the saturation level of the media 134' and byproduct purging requirements. Incorporation of the water reservoir 156 and wicking material 158 into the anode reactant recycling system 110' militates against dry media 134'.

FIG. 5 shows another embodiment of the invention similar to that shown in FIG. 3. Reference numerals for similar structure in respect of the description of FIG. 3 are repeated in FIG. 5 with a double prime (″) symbol.

FIG. 5 illustrates the addition of a water reservoir 156 and a wicking material 158 to the anode reactant recycling system 110″. It should be appreciated that, unless otherwise noted, the anode reactant recovery system 110″ may correspond substantially in structure and operation to the anode reactant recovery system 110, 110′ of the art described hereinabove.

In use, the condensate 152″ in excess of the media 134″ saturation point passes through the media 134″ and collects in the water reservoir 156 due to a force of gravity. As illustrated in FIG. 5, the water reservoir 156 is a conduit style reservoir, in fluid communication with the media 134″ and the bleed conduit 116″ at opposing ends of the water reservoir 156.

It should be appreciated that the anode reactant recovery system 110, 110′, 110″ eliminates the need for the anode heat exchanger while providing a system 110, 110′, 110″ that includes fewer components and is less costly to manufacture. A fuel cell system may be formed by combining the anode reactant recovery system 110, 110′, 110″ and the FCS 112, comprising a plurality of individual fuel cells. It is surprisingly found that the system 110, 110′, 110″ increases the volumetric efficiency of a fuel cell stack and uses a single valve for removal of condensate and reactant byproducts from the system 110, 110′, 110″. The system 110, 110′, 110″ also provides a startup pressurization volume, optimizing startup of the fuel cell stack resulting in a decreased potential of electrode corrosion during startup.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. An anode reactant recycling system comprising:
   a hollow main body including an inlet, a recycle outlet, and a draining outlet, the inlet adapted to receive a fluid;
   a bleed conduit providing fluid communication between the inlet and the draining outlet;
   an injector in fluid communication with a fuel source and the hollow main body adapted to inject a fuel into the hollow main body;
   a water separator disposed in the hollow main body adapted to remove a condensate from the fluid;
   a hydrophilic porous media disposed in the draining outlet, in fluid communication with the water separator, and adapted to collect the condensate in the hollow main body, thereby hydrating the hydrophilic porous media and militating against gas transfer through the hydrophilic porous media;
   a water reservoir disposed adjacent the hydrophilic porous media adapted to receive the condensate draining from the hydrophilic porous media; and
   a wicking material facilitating fluid communication between the water reservoir and the hydrophilic porous media;
   wherein the anode reactant recycling system is operable to exhaust a first portion of the fluid from the anode reactant recycling system through the bleed conduit and a second portion of the fluid is operable to enter the hollow main body, mix with the fuel, and pass through the water separator before exiting the anode reactant recycling system through the recycle outlet.

2. The anode reactant recycling system according to claim 1, wherein the hydrophilic porous media is sealingly disposed in the draining outlet by adhesion or a friction fit.

3. The anode reactant recycling system according to claim 1, wherein the hydrophilic porous media has a pore size from about 1 to about 10 microns.

4. The anode reactant recycling system according to claim 1, wherein the hydrophilic porous media is one of a metal mesh, a sintered metal mesh, a bonded metal mesh, a woven cloth, and a porous foam.

5. The anode reactant recycling system according to claim 1, further including an ejector disposed between the injector and the water separator.

6. The anode reactant recycling system according to claim 1, wherein the water separator includes a plurality of water capture features.

7. The anode reactant recycling system according to claim 1, further comprising an exhaust valve disposed adjacent the bleeding output.

8. The anode reactant recycling system according to claim 1, wherein the injector is a component of a jet pump.

9. The anode reactant recycling system according to claim 1, wherein the hollow main body is a chamber adapted for pre-pressurization during startup.

10. The anode reactant recycling system according to claim 1, wherein the anode reactant recycling system is disposed in a fuel cell end unit.

11. The anode reactant recycling system according to claim 1, wherein the anode reactant recycling system is disposed in a fuel cell system.

12. An anode reactant recycling system comprising:
    a hollow main body including an inlet, a recycle outlet, and a draining outlet, the inlet adapted to receive a fluid;
    a bleed conduit facilitating fluid communication between the inlet and the draining outlet;
    an injector disposed in the hollow main body and adapted to inject a fuel from a fuel source;
    a water separator disposed in the hollow main body adapted to remove a condensate from the fluid;
    a hydrophilic porous media disposed in the draining outlet, in fluid communication with the water separator, and adapted to collect the condensate in the hollow main body, thereby hydrating the hydrophilic porous media and militating against gas transfer through the hydrophilic porous media; and
    a water reservoir disposed adjacent the hydrophilic porous media adapted to receive the condensate passing through the hydrophilic porous media; and
    a wicking material facilitating fluid communication between the water reservoir and the hydrophilic porous media;
    wherein the anode reactant recycling system is operable to exhaust a first portion of the fluid from the anode reactant recycling system through the bleed conduit and a second portion of the fluid is operable to enter the hollow main body, mix with the fuel, and pass through the water separator before exiting the anode reactant recycling system through the recycle outlet.

13. The anode reactant recycling system according to claim 12, wherein the hydrophilic porous media has a pore size from about 1 to about 10 microns.

14. The anode reactant recycling system according to claim 12, wherein the hydrophilic porous media is one of a metal mesh, a sintered metal mesh, a bonded metal mesh, a woven cloth, and a porous foam.

15. The anode reactant recycling system according to claim 12, wherein the hollow main body is a chamber adapted for pre-pressurization during startup.

16. The anode reactant recycling system according to claim 12, wherein the injector is a component of a jet pump.

17. A method for the recycling of anode reactants in a fuel cell comprising the steps of:
- providing a hollow main body including an inlet, a recycle outlet, and a draining outlet, the inlet adapted to receive a fluid;
- providing a bleed conduit facilitating fluid communication between the inlet and the draining outlet;
- providing an injector disposed in the hollow main body and adapted to inject a fuel from a fuel source;
- providing a water separator disposed in the hollow main body adapted to remove a condensate from the fluid;
- providing a hydrophilic porous media in fluid communication with the water separator;
- providing a water reservoir disposed adjacent the hydrophilic porous media adapted to receive the condensate passing through the hydrophilic porous media;
- providing a wicking material facilitating fluid communication between the water reservoir and the hydrophilic porous media;
- providing an anode exhaust stream to the inlet;
- dividing the anode exhaust stream into one of a first portion entering the bleed conduit and a second portion entering the hollow main body;
- exhausting the first portion of the anode exhaust stream through the draining outlet;
- injecting the fuel into the hollow main body and mixing the second portion of the anode exhaust stream with the fuel;
- collecting the condensate formed in the hollow main body with the water separator;
- hydrating the hydrophilic porous media with the condensate, the hydrated media militating against transfer of one of the first portion of the anode exhaust stream and the second portion of the anode exhaust stream through the hydrophilic porous media;
- exhausting the condensate in excess of a saturation point of the hydrophilic porous media through the hydrophilic porous media; and
- exhausting the second portion of the anode exhaust stream and the injected fuel through the recycle outlet.

* * * * *